No. 738,371. Patented September 8, 1903.

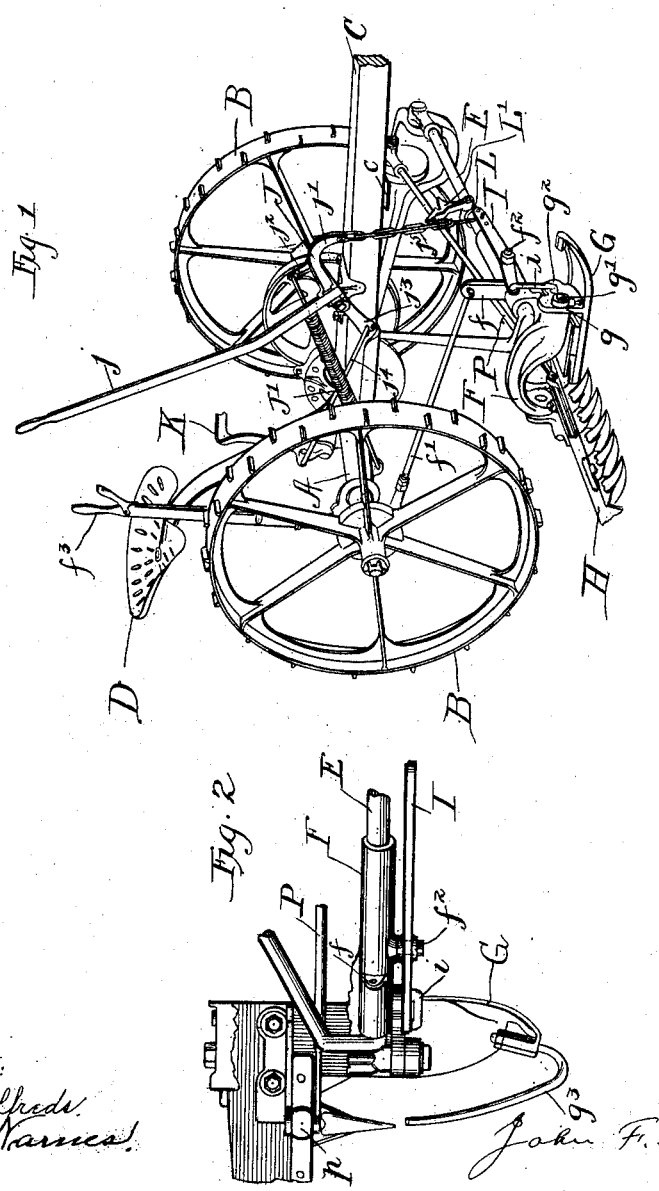

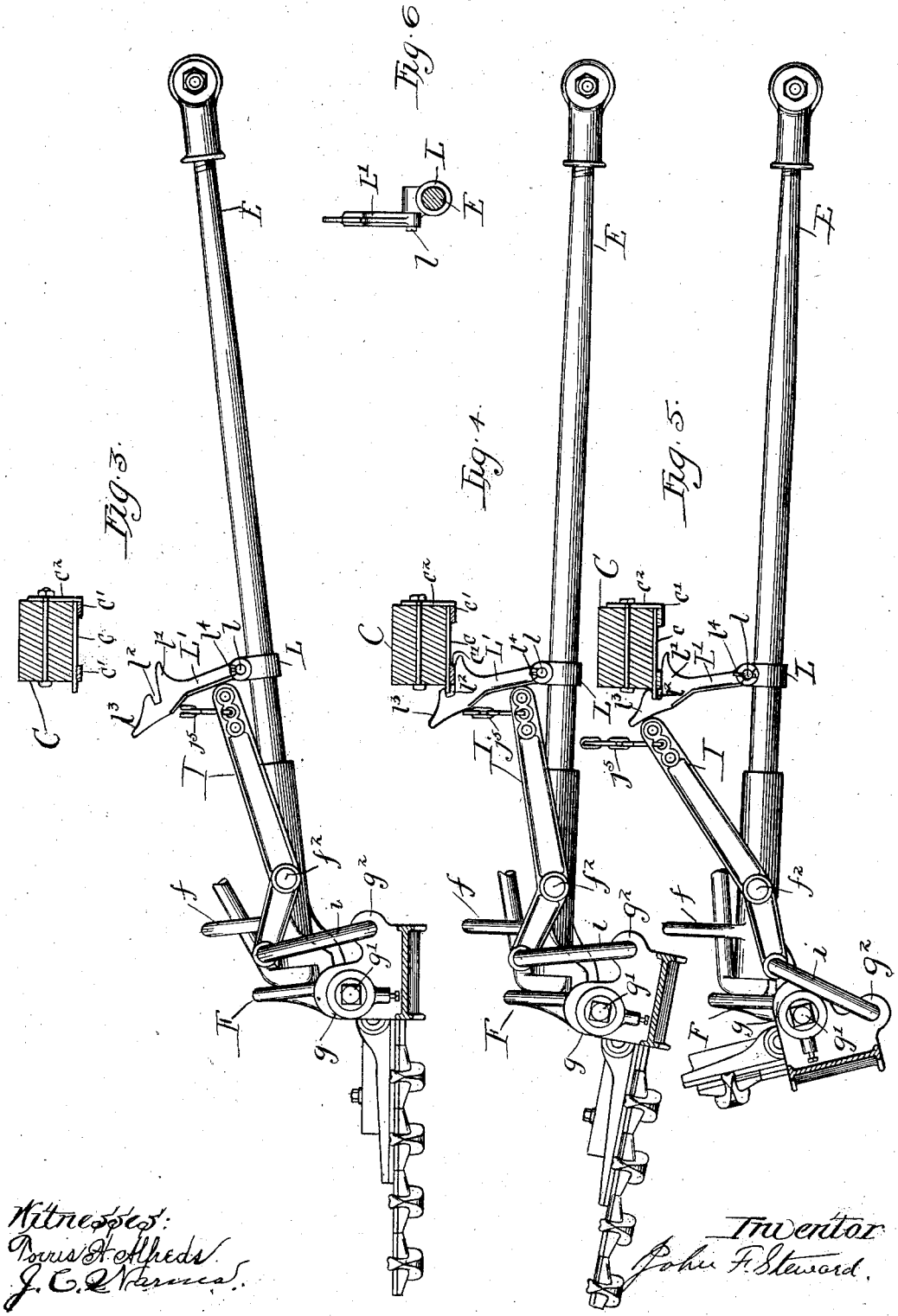

UNITED STATES PATENT OFFICE.

JOHN F. STEWARD, OF CHICAGO, ILLINOIS, ASSIGNOR TO INTERNATIONAL HARVESTER COMPANY, OF CHICAGO, ILLINOIS.

MOWING-MACHINE.

SPECIFICATION forming part of Letters Patent No. 738,371, dated September 8, 1903.

Application filed October 17, 1902. Serial No. 127,746. (No model.)

*To all whom it may concern:*

Be it known that I, JOHN F. STEWARD, a citizen of the United States, residing at Chicago, in the county of Cook and State of Illinois, have invented a new and useful Improvement in Mowing-Machines, of which the following is a specification.

The object of my invention is to provide improved and simple means which will counterpoise the cutting apparatus and at the same time operate to elevate the outer end of the finger-bar to any desired height or to an approximately vertical position when desired.

Figure 1 is a perspective view of so much of a mower as is required to illustrate my invention. Fig. 2 is a fragmentary plan of the cutting mechanism with a portion of the swivel-hinge broken away. Figs. 3, 4, and 5 show the finger-bar of the cutting apparatus in the normal working position partially folded and completely folded, respectively, also the compensating feature of the gag-lever, link, and shoe, and the operation of the device for supporting the coupling-frame when once raised. Fig. 6 is a section through the coupling-frame adjacent to the dog or catch which attaches automatically to the tongue.

This improvement is adapted to be used upon any of the ordinary types of mowers, but is shown applied to the Deering mower.

Briefly stated, the novelty consists in interposing a link between the short end of the gag-lever and a lug on the inner shoe, the arrangement being such that the lever is compensating in its operation and actuated by the same lever that lifts the cutting apparatus.

A further novelty consists of the device and means for operating the same by which the coupling-frame is held up when once raised, the purpose of which will be more fully explained.

A represents a portion of the main frame of a mower, upon which the usual driving-gearing is mounted; B, the traction-wheels; C, the draft-tongue, and D the operator's seat.

Pivoted to the main frame in the usual manner is the coupling-frame E, on which is placed the swivel-hinge F. To this swivel-hinge is pivotally connected the inner shoe G, to which is rigidly secured the finger-bar H. The swivel-hinge F is provided on its upper portion with an upwardly-extending lug $f$. Through the lever $f^3$, provided with the usual notched quadrant and latch-lever and the rod $f'$, which extends from said lever $f^3$ to the upper end of said lug $f$, the swivel-hinge and entire cutting apparatus may be tilted as desired. On the side of and preferably integral with the said swivel-hinge is the stud $f^2$, on which pivots the gag-lever I.

There is no modification in the construction of the shoe G peculiar to my invention except $g$, preferably the forward one of the two lugs, by means of which connection is made with the shoe on the swivel-hinge. This said forward lug $g$ is provided with a stubbleward extension $g^2$, which receives the end of the link $i$, connecting the short end of the gag-lever I with the extension of said lug. The position where this link and lug articulate is located, preferably, stubbleward from and slightly below the pivotal axis $g'$ of said swivel-hinge and shoe G.

J is the compensating lever, pivotally secured to a suitable casting on the main frame, preferably to C, the tongue portion thereof. This lever is operated by the handle $j$ and provided with three arms $j'$, $j^2$, and $j^3$, to which are attached, respectively, the chain $j^5$, extending to and connecting with the long end of the gag-lever I, the helical tension-spring J', extending to and connecting with a fixed portion of the main frame of the machine, and the rod $j^4$, extending to and pivotally connected with the foot-lever K. $g^3$ is the usual fender-rod.

On the forward member of the coupling-bar E is rigidly secured the sleeve L, provided with the stud $l$, preferably integral therewith and transverse to the longitudinal axis of said sleeve. On this stud $l$ pivots the dog L', the movement of the dog being limited by the pin $l^4$ in said stud engaging segmental recesses formed in the end of the sleeve of said dog. The position of the sleeve L on the coupling-frame is such that when the coupling-frame is raised the dog L' will engage the spring-held slide $c$ in a manner to be more fully described. The slide $c$ is held beneath the tongue C by the supports $c'$, while the spring $c^2$, bolted to the stubbleward side of the tongue, permits a yielding movement in that direction of said slide $c$, but normally holds it in the position shown in Figs. 1, 4, and 5. The operative relation of the gag-lever I and the dog L' is such that movement of said gag-lever will operate said dog.

The purpose and nature of the improvement will be more clearly set forth in the following description of its operation: The spring J', acting on the lifting-lever J, operates, through the gag-lever I and connecting-link $i$, to "float" both the inner and outer ends of the cutting apparatus. When it is desired to raise the finger-bar H over a slight obstruction or in turning a corner, it can be done by the foot-lever $k$. If it becomes necessary, however, to fold the finger-bar higher, both the foot and hand lever may be used, or the hand-lever alone. Figs. 1, 3, 4, and 5 show the relative position of the gag-lever I, link $i$, pivotal axis of swivel-hinge F, and shoe G and adjacent parts. It will be observed from an inspection of these figures that as the finger-bar is folded from a normal to a vertical position the lever-arm formed by the link $i$, connecting the gag-lever I to the shoe G, is shortened relative to the axis $g'$ about which it operates in passing from the position shown in Fig. 3 to that shown in Figs. 4 and 5, thus giving the greatest leverage when the center of gravity is the greatest distance from the fulcrum of the lever and gradually lessening as the center of gravity of said finger-bar approaches to a position vertically above said fulcrum. The adjustment of the spring and gag-lever is such that when the lifting-lever is first moved it will raise the cutting apparatus as a whole, the finger-bar remaining practically parallel to the ground until the lip $l'$ of the dog L' impinges against the slide-support $c'$ beneath the tongue C. This limits the upward movement of the coupling-bar, and further movement of the lifting-lever will rock the gag-lever I on its axis $f^2$, causing the finger-bar to fold, and the long end in contact with the back of the dog L' will press the said dog forward into engagement with the slide $c$, as shown in Fig. 5. Fig. 3 shows the position of gag-lever and dog L' when the cutting apparatus is in normal working position. Fig. 4 shows same when the cutting apparatus has been raised until the dog L' strikes the slide-support $c'$ and prevents further upward movement of the coupling-frame, no folding of the finger-bar having yet occurred. From this position any further applications of force on the lifting-lever will operate to fold the said finger-bar. Fig. 5 shows the gag-lever raised to its limiting position and the dog pressed into engagement with the slide. If owing to inaccuracies in construction or adjustment the dog should occupy a position too far toward the tongue, the stop-pin $l^4$ will limit its movement in that direction and the nose $l^3$, impinging against the yieldingly-held slide $c$, will press the said slide back against the spring $c^2$ until the notch $l^2$ in said dog is brought into engagement with the said slide.

What I claim as my invention, and desire to secure by Letters Patent, is—

1. In a mowing-machine, a main frame, a coupling-frame pivoted thereto, a lifting-lever, a shoe pivotally connected to said coupling-frame and supporting the cutting apparatus, a gag-lever pivotally mounted on the coupling-frame, one end thereof being connected to said lifting-lever, and a link connecting the other end of the said gag-lever with an arm on said shoe, all combined substantially as described.

2. In a mowing-machine, a main frame, a coupling-frame pivoted thereto, a lifting-lever, a shoe pivotally connected to said coupling-frame and supporting the cutting apparatus, a gag-lever pivotally mounted on the coupling-frame, one end thereof being connected to said lifting-lever, and a link connecting the other end of the said gag-lever with an arm on said shoe, the pivotal point of said link and shoe being stubbleward and slightly below the pivotal axis of said coupling-frame and shoe, all combined substantially as described.

3. In a mowing-machine, a main frame, a coupling-frame pivoted thereto, a lifting-lever, a shoe pivotally connected to said coupling-frame and supporting the cutting apparatus, a gag-lever pivotally mounted on the coupling-frame, one end thereof being connected to the said lifting-lever, and a compensating device interposed between the other end of the gag-lever and said shoe, all combined substantially as described.

4. In a mowing-machine, a main frame, a coupling-frame pivoted thereto, a lifting-lever, a swivel-hinge secured to said coupling-frame, a shoe pivotally connected to said swivel-hinge, a gag-lever pivotally mounted on the swivel-hinge, one end thereof being connected to the said lifting-lever, and a compensating device interposed between the other end of the gag-lever and said shoe, all combined substantially as described.

5. In a mowing-machine, a main frame, a coupling-bar pivoted thereto, a swivel-hinge secured to said coupling-bar, a gag-lever, cutting apparatus pivotally secured to said swivel-hinge, a latch pivotally secured to the tongue of said machine, a stud-bearing sleeve secured to the forward member of said coupling-bar, a dog journaled on the stud of said sleeve, said dog adapted to be operated by the rocking movement of said gag-lever and engage a latch on the tongue of said machine, all combined substantially as described.

6. In a mowing-machine, a main frame, a coupling-bar pivoted thereto, a swivel-hinge secured to said coupling-bar, a gag-lever, cutting apparatus pivotally secured to said swivel-hinge, a spring-actuated slide or latch, a stud-bearing sleeve secured to the forward member of said coupling-bar, a dog journaled on the stud of said sleeve, said dog adapted to be operated by the rocking movement of said gag-lever, and engage said spring-actuated latch which is secured to the tongue of said machine, all combined substantially as described.

7. In a mowing-machine, a main frame, a coupling-bar pivoted thereto, a swivel-hinge secured to said coupling-bar, a gag-lever, cutting apparatus pivotally secured to said swivel-hinge, a coupling-bar-retaining device secured to said main frame, and means actuated by the said gag-lever adapted to engage the said coupling-bar-retaining device and support the coupling-frame when raised, all combined substantially as described.

JOHN F. STEWARD.

In presence of—
J. C. WARNES,
TORRIS H. ALFREDS.